US008623513B2

(12) United States Patent
Wu

(10) Patent No.: US 8,623,513 B2
(45) Date of Patent: Jan. 7, 2014

(54) HYDROPHOBIC POLYETHERIMIDE/POLYSILOXANE COPOLYMER INTERMEDIATE TRANSFER COMPONENTS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1032 days.

(21) Appl. No.: 12/200,111

(22) Filed: Aug. 28, 2008

(65) Prior Publication Data

US 2010/0055445 A1 Mar. 4, 2010

(51) Int. Cl.
*B32B 9/04* (2006.01)

(52) U.S. Cl.
USPC .......... 428/447; 428/327

(58) Field of Classification Search
None
See application file for complete search history.

(56) References Cited

U.S. PATENT DOCUMENTS 4,426,435 A * 1/1984 Oka .......... 430/132
5,487,707 A 1/1996 Sharf et al.
6,011,122 A * 1/2000 Puyenbroek .......... 525/425
6,318,223 B1 11/2001 Yu et al.
6,440,515 B1 8/2002 Thornton et al.
6,489,020 B1 * 12/2002 Caruthers et al. .......... 428/327
6,602,156 B2 8/2003 Schlueter, Jr.
7,031,647 B2 4/2006 Mishra et al.
7,130,569 B2 10/2006 Goodman et al.
7,139,519 B2 11/2006 Darcy, III et al.
2005/0025984 A1 * 2/2005 Odell et al. .......... 428/447
2009/0116881 A1 * 5/2009 Shirose et al. .......... 399/308
2010/0051171 A1 3/2010 Wu et al.
2010/0055328 A1 3/2010 Wu et al.
2010/0055463 A1 3/2010 Wu
2011/0008720 A1 * 1/2011 Yasukawa et al. .......... 430/107.1

FOREIGN PATENT DOCUMENTS

WO WO 2007000821 A1 * 1/2007

OTHER PUBLICATIONS

"Xps and Sims Surface Chemical Analysis of Some Important Classes of Polymeric Biomaterials", L. Sabbatini. P.G. Zambonin/ Journal of Electron Spectroscopy and Related Phenomena 81 (1996) 285-301.*

Jin Wu, U.S. Appl. No. 12/200,074, filed Aug. 28, 2008, entitled Hydrophobic Carbon Black Intermediate Transfer Components, filed concurrently herewith.

Jin Wu et al., U.S. Appl. No. 12/200,147, filed Aug. 28, 2008, entitled Coated Seamed Transfer Member, filed concurrently herewith.

Jin Wu et al., U.S. Appl. No. 12/200,179, filed Aug. 28, 2008, entitled Coated Transfer Member filed concurrently herewith.

Jin Wu, U.S. Appl. No. 12/129,995, entitled Polyimide Intermediate Transfer Components, filed May 30, 2008.

Jin Wu, U.S. Appl. No. 12/181,354, entitled Core Shell Intermediate Transfer Components, filed Jul. 29, 2008.

Jin Wu, U.S. Appl. No. 12/181,409, entitled Treated Carbon Black Intermediate Transfer Components, filed Jul. 29, 2008.

* cited by examiner

*Primary Examiner* — Callie Shosho
*Assistant Examiner* — Kenneth Stachel
(74) *Attorney, Agent, or Firm* — Eugene O. Palazzo

(57) ABSTRACT

An intermediate transfer member that includes a polyetherimide/polysiloxane polymer, additives of polymers, and conductive compounds, and an optional release layer.

11 Claims, No Drawings

HYDROPHOBIC POLYETHERIMIDE/POLYSILOXANE COPOLYMER INTERMEDIATE TRANSFER COMPONENTS

CROSS REFERENCE TO RELATED APPLICATIONS

Illustrated in U.S. application Ser. No. 12/200,074, U.S. Publication No. 20100055463, entitled Hydrophobic Carbon Black Intermediate Transfer Components, filed Aug. 8, 2008, is an intermediate transfer member comprised of a substrate comprising a carbon black surface treated with a fluorinated polymer.

Illustrated in U.S. application Ser. No. 12/200,147, U.S. Publication No. 20100055328, entitled Coated Seamed Transfer Member, filed Aug. 8, 2008, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179, U.S. Publication No. 20100051171, entitled Coated Transfer Member, filed Aug. 8, 2008, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 12/129,995, U.S. Publication No. 20090297232, filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of from about 175° C. to about 290° C. over a period of time of from about 10 minutes to about 120 minutes.

Illustrated in U.S. application Ser. No. 12/181,354, U.S. Publication No. 20100028700, filed Jul. 29, 2008, entitled Core Shell Intermediate Transfer Components, the disclosure of which is totally incorporated herein by reference, is an intermediate transfer belt comprised of a substrate comprising a conductive core shell component.

Illustrated in U.S. application Ser. No. 12/181,409, now U.S. Pat. No. 7,738,824, filed Jul. 29, 2008, entitled Treated Carbon Black Intermediate Transfer Components, the disclosure of which is totally incorporated herein by reference, is an intermediate transfer member comprised of a substrate comprising a poly(vinylalkoxysilane) surface treated carbon black.

FIELD OF THE DISCLOSURE

Disclosed are intermediate transfer members, and more specifically, intermediate transfer members useful for accomplishing the transfer of a developed image in an electrostatographic, for example xerographic, including digital, image on image, and the like, machines or apparatuses and printers. In embodiments, there are selected intermediate transfer members comprised of a polymer and a conductive component, at least one of a carbon black and a polyaniline which is subsequently dispersed in a polymer solution. The polymer selected in embodiments is a polyetherimide/polysiloxane copolymer, and more specifically a polyetherimide/polysiloxane block copolymer; a mixture or blend of a polyetherimide/polysiloxane copolymer, and a second polymer selected from the group consisting of, for example, a polyimide, a polycarbonate, a polyvinylidene fluoride (PVDF), a poly(butylene terephthalate) (PBT), and a poly(ethylene-co-tetrafluoroethylene) copolymer. The polymer blend or mixtures thereof selected can be comprised, for example, of a polyetherimide/polysiloxane block copolymer and a polyimide. While not being desired to be limited by theory, it is believed that the polyetherimide block of the copolymer interacts with the polyimide while the polysiloxane block of the copolymer imparts hydrophobicity to the member across its bulk without phase separation.

A number of advantages are associated with the intermediate transfer members, such as belts (ITB) of the present disclosure, such as excellent dimensional stability; acceptable conductivities; excellent surface resistivity; ITB humidity insensitivity for extended time periods; excellent dispersability in a polymeric solution; low and acceptable surface friction characteristics; and a simplified economic ITB formation.

In an electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant, which are commonly referred to as toner. Generally, the electrostatic latent image is developed by bringing a developer mixture into contact therewith. The developer mixture usually comprises carrier granules having toner particles adhering triboelectrically thereto, or a liquid developer material, which may include a liquid carrier having toner particles, dispersed therein. The developer material is advanced into contact with the electrostatic latent image, and the toner particles are deposited thereon in image configuration. Subsequently, the developed image is transferred to a copy sheet. It is advantageous to initially transfer the developed image to a coated intermediate transfer web, belt or component, and subsequently transfer with very high transfer efficiency the developed image from the intermediate transfer member to a permanent substrate. The toner image is subsequently usually fixed or fused upon a support, which may be the photosensitive member itself, or other support such as paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred and little residual toner remains on the surface from which the image was transferred.

Intermediate transfer members may provide a number of advantages such as enabling high throughput at modest process speeds; improving registration of the final color toner image in color systems using synchronous development of one or more component colors using one or more transfer stations, and increasing the range of final substrates that can be used. However, a disadvantage of using an intermediate transfer member is that a plurality of transfer steps is usually accomplished allowing for the possibility of charge exchange occurring between toner particles and the transfer member which ultimately can lead to less than complete toner transfer, which results in low resolution images on the image receiving substrate and image deterioration; color shifting and color deterioration.

In embodiments, the resistivity of the intermediate transfer member is within a range to allow for sufficient transfer. It is also desired that the intermediate transfer member have a controlled resistivity, wherein the resistivity is virtually unaffected by changes in humidity, temperature, bias field, and operating time. In addition, a controlled resistivity is of value so that a bias field can be established for electrostatic transfer. Also, it is of value that the intermediate transfer member not be too conductive as air breakdown can possibly occur.

Attempts at controlling the resistivity of intermediate transfer members have been accomplished by, for example, adding conductive fillers such as ionic additives and/or carbon black to the outer layer. However, there are problems associated with the use of such additives. In particular, undissolved additive particles frequently bloom or migrate to the surface of the polymer and cause an imperfection in the polymer. This leads to nonuniform resistivity, which in turn causes poor antistatic properties and poor mechanical strength. Also, the ionic additives formed on the surface of the transfer member may interfere with toner release. Furthermore, bubbles may appear in the intermediate transfer member conductive polymer, some of which can only be seen with the aid of a microscope, others of which are large enough to be observed with the naked eye, which bubbles cause poor or nonuniform electrical properties and poor mechanical properties in the intermediate transfer member. In addition, the ionic additives themselves are sensitive to changes in temperature, humidity, and operating time. These sensitivities often limit the resistivity range. For example, the resistivity usually decreases by up to two orders of magnitude, or more as the humidity increases from about 20 percent to 80 percent relative humidity.

Therefore, it is desired to provide a weldable intermediate transfer belt, which has excellent transfer ability, possesses excellent humidity insensitivity, and permits improved copy quality. It is also desired to provide a weldable intermediate transfer belt that may not, but could, have puzzle cut seams, but instead, has a weldable seam, thereby providing a belt that can be manufactured without such labor intensive steps as manually piecing together the puzzle cut seam with fingers, and without the lengthy high temperature and high humidity conditioning steps.

REFERENCES

Illustrated in U.S. Pat. No. 7,031,647, the disclosure of which is totally incorporated herein by reference, is an imageable seamed belt containing a lignin sulfonic acid doped polyaniline.

Illustrated in U.S. Pat. No. 7,139,519, the disclosure of which is totally incorporated herein by reference, is an intermediate transfer belt, comprising a belt substrate comprising primarily at least one polyimide polymer; and a welded seam.

Illustrated in U.S. Pat. No. 7,130,569, the disclosure of which is totally incorporated herein by reference, is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707, 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and very costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

In embodiments, there is disclosed an intermediate transfer member comprised of a substrate comprising a polyetherimide/polysiloxane copolymer; a transfer media comprised of a polyetherimide/polysiloxane block copolymer; and a transfer media wherein the polyetherimide/polysiloxane copolymer is a block copolymer of a polyetherimide and a polysiloxane available from SABIC Innovative Plastics as ULTEM®.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image, and to form a developed image on the charge retentive surface; a weldable intermediate transfer belt to transfer the developed image from the charge retentive surface to a substrate, and a fixing component.

EMBODIMENTS

Aspects of the present disclosure relate to an intermediate transfer member comprised of a substrate comprising a polyetherimide polysiloxane polymer; an intermediate transfer media comprised of a polyetherimide polysiloxane polymer; and an apparatus for forming images on a recording medium comprising a charge retentive surface to receive an electrostatic latent image thereon; a development component to apply toner to the charge retentive surface to develop the electrostatic latent image, and to form a developed image on the charge retentive surface; and an intermediate transfer belt for transferring the developed image from the charge retentive surface to a substrate, wherein the intermediate transfer belt is comprised of a substrate comprising a polyetherimide/polysiloxane copolymer.

In embodiments there is disclosed a hydrophobic intermediate transfer member that includes a substrate of a mixture of carbon black, a polyetherimide polysiloxane copolymer wherein the weight percent of said polysiloxane in said polyetherimide polysiloxane copolymer is from about 10 to about 50 weight percent, wherein said copolymer present in an amount of from about 1 to about 50 weight percent possesses a weight average molecular weight of from about 20,000 to about 200,000, a polyimide, present in an amount of from about 1 to about 30 percent by weight and a polymer selected from the group consisting of a thermosetting polyimide, a thermoplastic polyimide, a polycarbonate, a polyvinylidene fluoride, a poly(butylene terephthalate), a poly(ethylene-co-tetrafluoroethylene) copolymer, and mixtures thereof, and an optional release layer present on said substrate.

Specific examples of polysiloxane/polyetherimide copolymers that may be selected for the intermediate transfer member, especially intermediate transfer belt, include a number of known copolymers such as a polysiloxane/polyetherimide block copolymer available as ULTEM® STM1500 ($T_g$=168° C.); ULTEM® STM1600 ($T_g$=195° C.); and ULTEM® STM1700 ($T_g$=200° C.), commercially available from Sabic Innovative Plastics. The chemical structure of ULTEM® STM1500 can be, it is believed, represented by the following most organic reaction chemistry except primarily for oxidative processes and free radical reactions.

The conductivity of carbon black is dependent on surface area and its structure primarily. Generally, the higher surface area and the higher structure, the more conductive the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates and the manner in which they are "fused" together. High structure carbon blacks

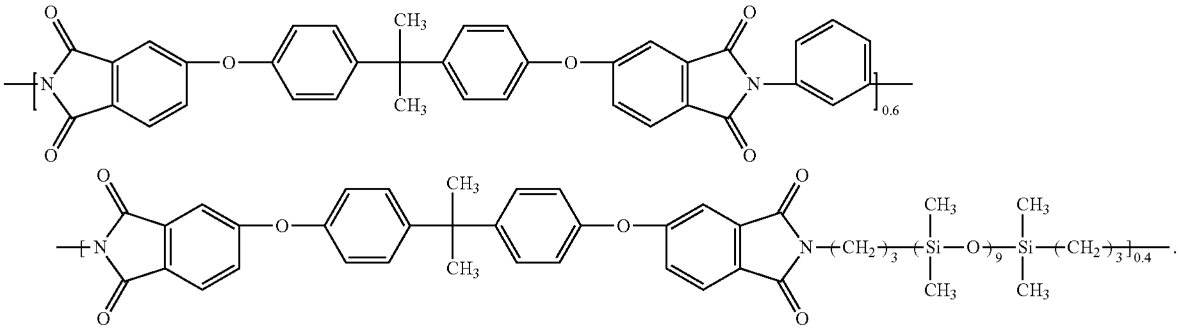

The weight average molecular weight ($M_w$) of the polysiloxane/polyetherimide copolymer can vary, for example, from about 5,000 to about 1,000,000, from about 20,000 to about 500,000, from about 50,000 to about 300,000, and from about 75,000 to about 175,000, and the like, wherein the weight percent of the polysiloxane block in the block copolymer is, for example, from about 5 to about 95, from about 10 to about 75, from about 15 to about 50, from about 20 to about 40, and other suitable percentages, and wherein the total of the components in the copolymer is about 100 percent.

A specific polysiloxane/polyetherimide polymer and copolymer, which is available from Sabic Innovative Plastics, can be prepared, for example, by reacting 2,2-bis(2,3-dicarboxyphenoxyphenol)propane dianhydride with metaphenyldiamine, and an aminopropyl-terminated $D_{10}$ polydimethylsiloxane.

The polysiloxane/polyetherimide copolymer is present in the intermediate transfer member in an amount of from about 0.1 to about 99 weight percent, from about 1 to about 50 weight percent, or from about 5 to about 30 weight percent.

Other components incorporated into the disclosed intermediate transfer members include conductive materials such as carbon blacks, polyanilines, and a number of suitable known polymers selected, for example, from the group consisting of a polyimide (both thermosetting and thermoplastic), a polycarbonate, a polyvinylidene fluoride (PVDF), a poly(butylene terephthalates) (PBT), a poly(ethylene-co-tetrafluoroethylene) copolymer, and mixtures thereof. The conductive material is present in the intermediate transfer member in, for example, an amount of from about 1 to about 30 weight percent, or from about 3 to about 15 weight percent with the additional polymer being present in an amount of from about 0 to about 98.9 weight percent, or from about 10 to about 90 weight percent. The total of all the intermediate transfer member components is equal to about 100 weight percent.

Carbon black surface groups can be formed by oxidation with an acid or with ozone, and where there is absorbed or chemisorbed oxygen groups from, for example, carboxylates, phenols, and the like. The carbon surface is essentially inert to are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks treated in accordance with the present disclosure include VULCAN® carbon blacks, REGAL® carbon blacks, BLACK PEARLS® carbon blacks available from Cabot Corporation. Specific examples of conductive carbon blacks are BLACK PEARLS® 1000 (B.E.T. surface area=343 $m^2/g$, DBP absorption=105 ml/g), BLACK PEARLS® 880 (B.E.T. surface area=240 $m^2/g$, DBP absorption=106 ml/g), BLACK PEARLS® 800 (B.E.T. surface area=230 $m^2/g$, DBP absorption=68 ml/g), BLACK PEARLS® L (B.E.T. surface area=138 $m^2/g$, DBP absorption=61 ml/g), BLACK PEARLS® 570 (B.E.T. surface area=110 $m^2/g$, DBP absorption=114 ml/g), BLACK PEARLS® 170 (B.E.T. surface area=35 $m^2/g$, DBP absorption=122 ml/g), VULCAN® XC72 (B.E.T. surface area=254 $m^2/g$, DBP absorption=176 ml/g), VULCAN® XC72R (fluffy form of VULCAN® XC72), VULCAN® XC605, VULCAN® XC305, REGAL® 660 (B.E.T. surface area=112 $m^2/g$, DBP absorption=59 ml/g), REGAL® 400 (B.E.T. surface area=96 $m^2/g$, DBP absorption=69 ml/g), and REGAL® 330 (B.E.T. surface area=94 $m^2/g$, DBP absorption=71 ml/g).

Examples of further components for the intermediate transfer member include additional conductive components and polymers, such as polyanilines. In embodiments, the polyaniline component has a relatively small particle size of from about 0.5 to about 5, from about 1.1 to about 2.3, from about 1.2 to about 2, from about 1.5 to about 1.9, or about 1.7 microns.

Specific examples of polyanilines selected for the intermediate transfer member are PANIPOL™ F commercially available from Panipol Oy, Finland; and lignosulfonic acid grafted polyaniline, represented by

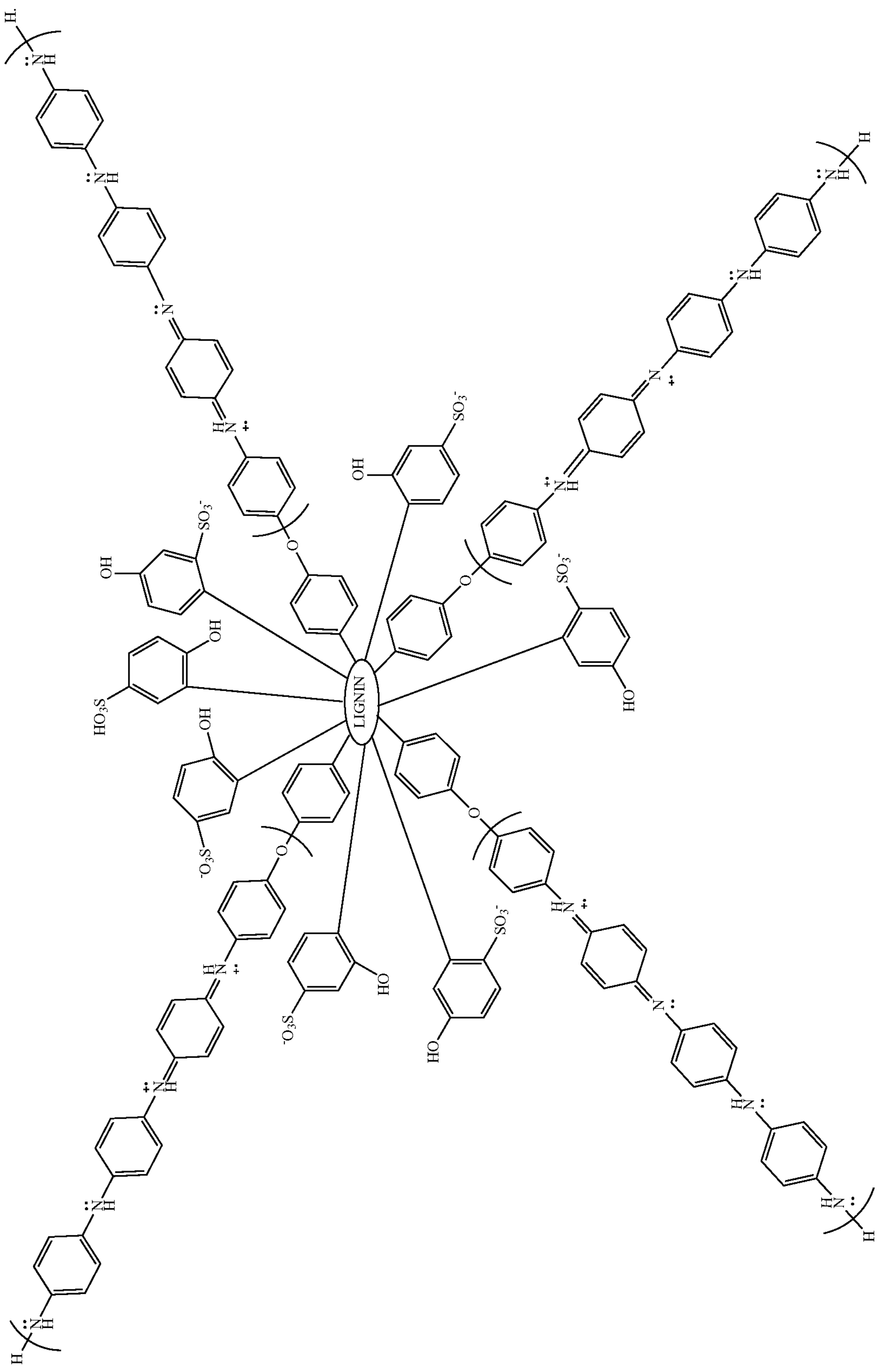

Examples of thermosetting polyimides that can be incorporated into the transfer member include low temperature and rapidly cured polyimide polymers, such as VTEC™ PI 1388, 080-051, 851, 302, 203, 201 and PETI-5, all available from Richard Blaine International, Incorporated, Reading, Pa. These thermosetting polyimides can be cured at temperatures of from about 180° C. to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Other thermosetting polyimides that can be selected for the ITM or ITB and cured at temperatures of above 300° C. include PYRE-M.L® RC-5019, RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; Durimide® 100 commercially available from FUJIFILM Electronic Materials U.S.A., Inc., North Kingstown, R.I.; and KAPTON® HN, VN and FN, all commercially available from E.I. DuPont, Wilmington, Del.

Examples of the thermoplastic polyimides selected for the transfer member include KAPTON® K, commercially available from E.I. DuPont, Wilmington, Del., represented by

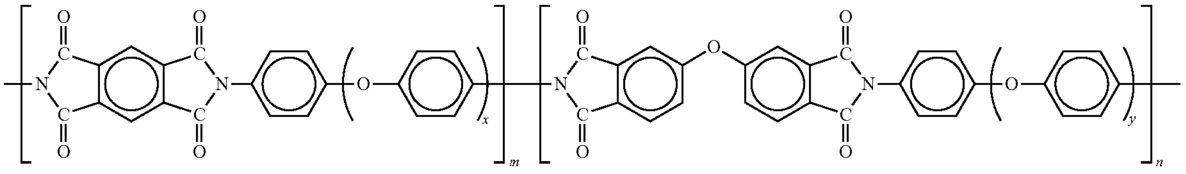

wherein x is equal to and 2; y is equal to 2; m and n are, for example, from about 10 to about 300; IMIDEX®, and commercially available from West Lake Plastic Company, represented by

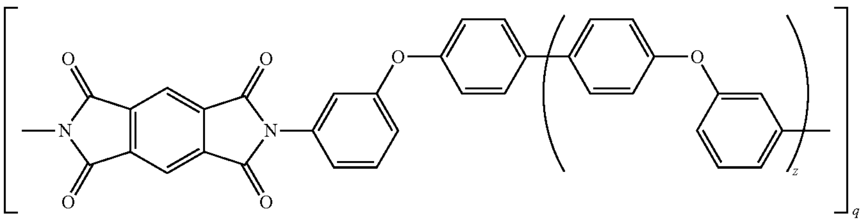

wherein z is equal to 1, and q is from about 10 to about 300.

As illustrated herein, the carbon black is usually formed into a dispersion with a number of materials, such as a blend of the polyetherimide/polysiloxane copolymer, and a polyimide. With proper milling processes, uniform dispersions can be obtained, and then coated on glass plates using a draw bar coating method. The resulting individual films can be dried at high temperatures, such as from about 100° C. to about 400° C., for a suitable period of time, such as from about 20 to about 180 minutes while remaining on the separate glass plates. After drying and cooling to room temperature, about 23° C. to about 25° C., the films on the glass plates can be immersed into water overnight, about 18 to 23 hours, and subsequently the 50 to 150 micron thick films can be released from the glass to from a functional intermediate transfer member.

The surface resistivity of the intermediate transfer member is, for example, from about $10^9$ to about $10^{13}$, or from about $10^{10}$ to about $10^{12}$ ohm/sq. The sheet resistivity of the intermediate transfer weldable member is, for example, from about $10^9$ to about $10^{13}$, or from about $10^{10}$ to about $10^{12}$ ohm/sq.

The intermediate transfer member can be of any suitable configuration. Examples of suitable configurations include a sheet, a film, a web, a foil, a strip, a coil, a cylinder, a drum, an endless strip, a circular disc, a belt including an endless belt, an endless seamed flexible belt, and an endless seamed flexible belt. The circumference of the member in a film or belt configuration, and with, for example, from about 1 to about 5 layers is from about 250 to about 2,500, from about 1,500 to about 2,500, or from about 2,000 to about 2,200 millimeters. The width of the film or belt is, for example, from about 100 to about 1,000, from about 200 to about 500, or from about 300 to about 400 millimeters. The weldable belt, in embodiments, has a smooth seam which permits excellent blade cleaning as compared to poor cleaning when a bumpy surface or bumpy seam is present.

While not desired to be limited by theory, it is believed that the polyetherimide of the polymer selected interacts with the a polyimide matrix, and the polysiloxane segment of the polymer provides hydrophobicity characteristics to the intermediate transfer member across the bulk of the member with minimal or no phase separation.

In a multi-imaging system, each image being transferred is formed on the photoconductor by an image forming station wherein each of these images is then developed at a developing station and transferred to the intermediate transfer member. The images formed on the photoconductor are developed sequentially, and then transferred to the disclosed intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed and transferred to the intermediate transfer member.

After the toner latent image has been transferred from the photoconductor to the intermediate transfer member, the intermediate transfer member may be contacted under heat and pressure with an image receiving substrate such as paper. The toner image on the intermediate transfer member is then transferred and fixed, in image configuration, to a substrate such as paper.

The following Examples are provided. All parts are percentages by weight of total solids unless otherwise indicated.

Comparative Example 1

Preparation of ITB Comprised of Carbon Black and Polyimide:

The VULCAN® XC72R carbon black (CB), obtained from Cabot Corporation, with a B.E.T. surface area of about 254 $m^2$/gram, and a DBP absorption of 176 milliliters/gram was mixed with the polyamic acid solution, VTEC™ PI 1388 (PI, 20 weight percent solids in NMP obtained from Richard Blaine International, Incorporated), with varying weight ratios (CB/PI=5.5/94.5 in Comparative Example 1(A); CB/PI=6/94 in Comparative Example 1(B); and CB/PI=6.5/93.5 in Comparative Example 1(C)). By ball milling with 2 millimeter stainless shot at 160 rpm overnight, about 23 hours, uniform dispersions were obtained, and then coated on glass plates using a draw bar coating method. Each film was dried at 100° C. for 20 minutes, and then 204° C. for an additional 20 minutes while remaining on the glass plates. After drying and cooling to room temperature, 23° C. to 25° C., the films on the individual glass plates were immersed into water overnight, about 23 hours, and 50 micron thick free standing separate films were released from the glass plates.

Example I

Preparation of ITB Comprised of Carbon Black, Polyetherimide/Polysiloxane Copolymer and Polyimide:

In a weight ratio of 6/89/5 VULCAN® XC72R carbon black, a VTEC™ PI 1388 polyamic acid solution, and the polyetherimide/polysiloxane block copolymer, ULTEM® STM1700 (obtained from SABIC Innovative Plastics) were mixed by ball milling with 2 millimeter stainless shot at 160 rpm overnight, about 23 hours, and a uniform dispersion mixture was obtained, and then coated on a glass plate using a draw bar coating method. The resulting film was dried at 100° C. for 20 minutes, and then 204° C. for an additional 20 minutes while remaining on the glass plate. After drying and cooling to room temperature, about 23° C., the film on the glass plate was immersed into water overnight, about 23 hours, resulting in a 50 micron thick released freestanding film.

Surface Resistivity Measurement

The ITB devices of Comparative Examples 1(A), 1(B), and 1(C), and Example I were measured for surface resistivity (under 1,000V, averaging four measurements at varying spots, 72° F./22 percent room humidity) using a High Resistivity Meter (Hiresta-Up MCP-HT450 obtained from Mitsubishi Chemical Corp.), and the results are provided in Table 1.

TABLE 1

| | Surface Resistivity (Ω/sq) |
|---|---|
| Comparative Example 1 (A) | $>10^{14}$ |
| Comparative Example 1 (B) | $>10^{14}$ |
| Comparative Example 1 (C) | $<10^{8}$ |
| Example I | $8.55 \times 10^{11}$ |

Generally, an ITB surface resistivity of from $10^8$ to $10^{13}$ ohm/sq is of value. The Example I ITB device surface resistivity was in the above value range of $10^8$ to $10^{13}$ ohm/sq, which was not the situation for the Comparatives Examples. A small change in the CB loading had an adverse effect on surface resistivity; that is, either the ITB was too conductive ($<10^8$ ohm/sq), or not conductive enough ($>10^{14}$ ohm/sq) primarily because the CB loadings were positioned on the vertical part of the percolation curve, which clearly presented a problem for manufacturing robustness, which problem was somewhat minimized with the Example I member.

Also, it is believed based on visual observations that the polyetherimide/polysiloxane block copolymer in the transfer member of Example I improved the dispersibility of the carbon black particles, thus a more controlled dispersion was obtained as compared to the Comparative Example ITBs Contact Angle Measurement The advancing contact angles in deionized water on the ITB devices of Comparative Example 1(B) and Example I were measured at ambient temperature (about 23° C.) using the Contact Angle System OCA (Dataphysics Instruments GmbH, model OCA15). At least ten measurements were performed, and their averages are reported in Table 2.

TABLE 2

| | Contact Angle |
|---|---|
| Comparative Example 1 (B) | 71 Degrees |
| Example I | 104 Degrees |

The disclosed ITB device (Example I) with the polyetherimide/polysiloxane block copolymer appeared significantly more hydrophobic (33 degrees higher contact angle), about 40 percent more hydrophobic, than the Comparative Example 1(B) ITB device without the polyetherimide/polysiloxane block copolymer.

The disclosed Example I hydrophobic ITB device with less humidity sensitivity as illustrated in the above Table data would, it is believed, possess more dimensional stability than the member of Comparative Example 1(B) since water is repelled by the Example I member, while water would be absorbed by the Comparative Example 1(B) ITB resulting in undesirable wrinkles causing induced transfer failures and print defects.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A hydrophobic intermediate transfer member consisting of a substrate of a mixture of carbon black, a polyetherimide polysiloxane copolymer as represented by th the following formula/structure wherein the weight percent of said polysiloxane in said polyetherimide polysiloxane copolymer is from about 10 to about 50 weight percent, wherein said copolymer present in an amount of from about 1 to about 50 weight percent possesses a weight average molecular weight of from about 20,000 to about 200,000, a polyimide, present in an amount of from about 1 to about 30 percent by weight and a polymer selected from the group consisting of a polycarbonate, a polyvinylidene fluoride, a poly(butylene terephthalate), a poly(ethylene-co-tetrafluoroethylene) copolymer, and mixtures thereof and wherein said carbon black to said polyimide to said polyetherimide polysiloxane copolymer weight ratio is 6/89/5

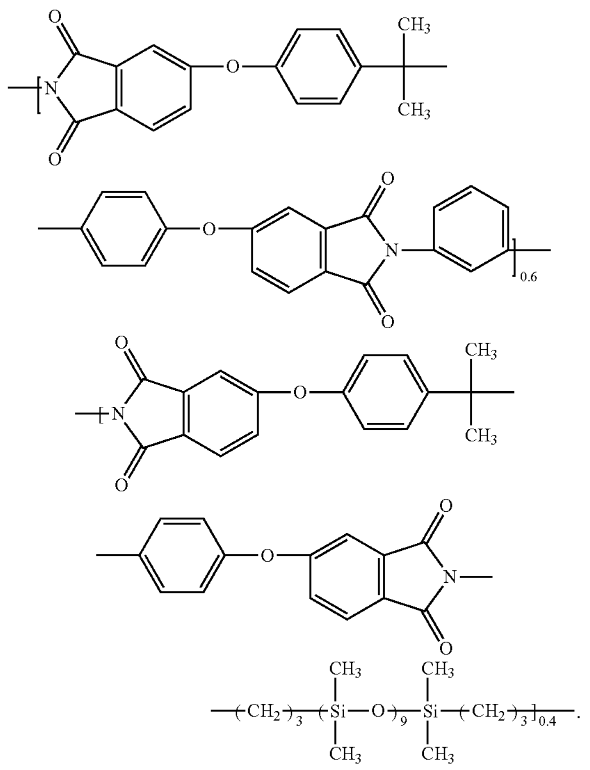

2. The intermediate transfer member in accordance with claim 1 wherein said polyetherimide polysiloxane copolymer is a block copolymer.

3. The intermediate transfer member in according with claim 2 wherein said block copolymer is prepared by reacting 2,2-bis(2,3-dicarboxyphenoxyphenol)propane dianhydride with metaphenyldiamines, and an aminopropyl-terminated $D_{10}$ polydimethylsiloxane.

4. The intermediate transfer member in accordance with claim 1 wherein the intermediate transfer member is a weldable belt.

5. The intermediate transfer member in accordance with claim 1 wherein said intermediate transfer member has a surface resistivity of from about $10^9$ to about $10^{13}$ ohm/sq.

6. The intermediate transfer member in accordance with claim 5 wherein said surface resistivity is from about $10^{10}$ to about $10^{12}$ ohm/sq.

7. The intermediate transfer member in accordance with claim 1 wherein said intermediate transfer member has a circumference of from about 250 to about 2,500 millimeters.

8. The intermediate transfer member in accordance with claim 1 wherein said polyetherimide polysiloxane is a block copolymer of said polyetherimide/polysiloxane incorporated in said polyimide.

9. The intermediate transfer member in accordance with claim 1 wherein said polyetherimide/polysiloxane copolymer is present in an amount of from about 10 to about 30 weight percent.

10. An apparatus for forming images on a recording medium consisting of:

a charge retentive surface to receive an electrostatic latent image thereon;

a development component to apply toner to said charge retentive surface to develop said electrostatic latent image, and to form a developed image on sad charge retentive surface; and an intermediate transfer component for transferring the developed image from said charge retentive surface to a substrate, wherein said intermediate transfer component consists of a substrate of a polyetherimide/polysiloxane copolymer as represented by the following formula wherein the weight percent of said polysiloxane in said polyetherimide/polysiloxane copolymer is from about 10 to about 50 weight percent, wherein said copolymer present in an amount of from about 1 to about 50 weight percent possesses a weight average molecular weight of from about 20,000 to about 200,000, carbon black, a polyimide, present in an amount of from about 1 to about 30 percent by weight and a polymer selected from the group consisting of a polycarbonate, a polyvinylidene fluoride, a poly(butylene terephthalate), a poly(ethylene-co-tetrafluoroethylene) copolymer, and mixtures thereof and wherein said carbon black to said polyimide to said polyetherimide polysiloxane copolymer weight ratio is 6/89/5

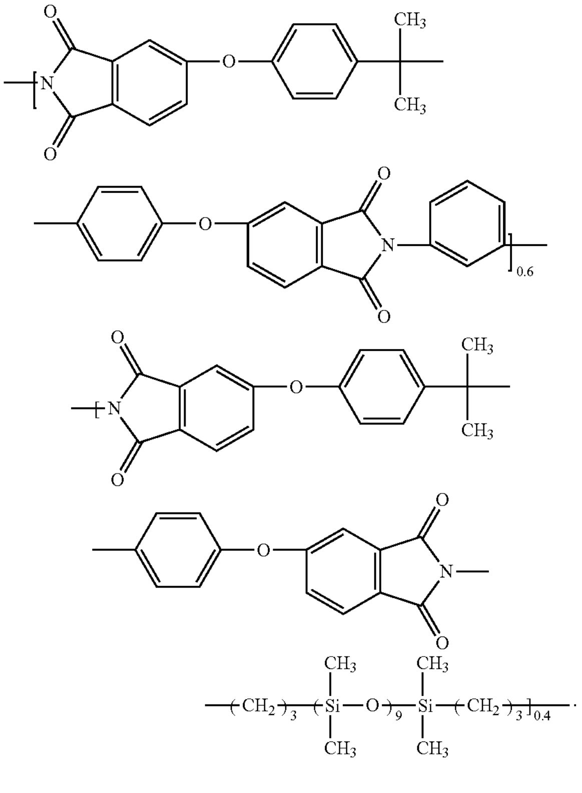

11. The apparatus in accordance with claim 10 wherein said charge retentive surface is a photoconductor.

* * * * *